E. M. WOODWARD.
DEVICE FOR TRANSMITTING POWER.
APPLICATION FILED OCT. 29, 1908.
1,016,535.
Patented Feb. 6, 1912.
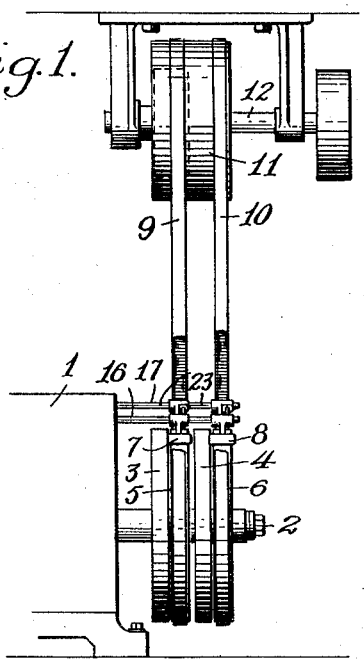
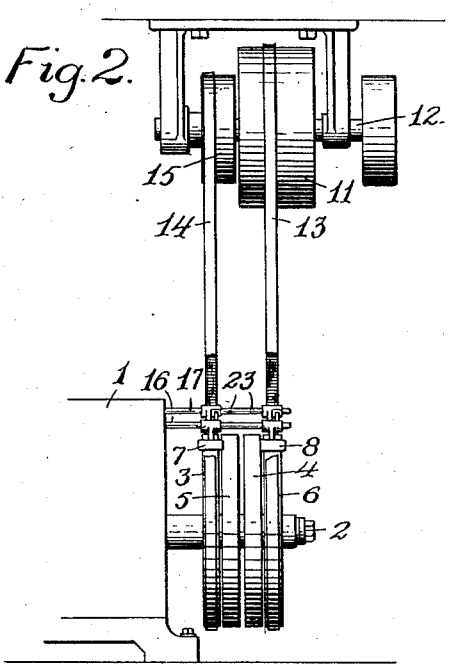
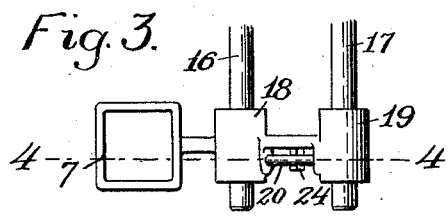
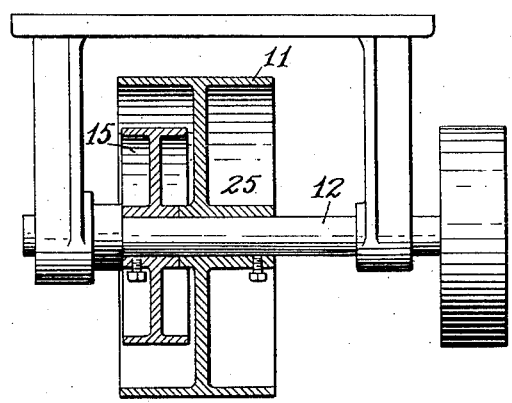
Witnesses
R. J. Tolman.
Penelope Cumberbach.
Inventor
Edward M. Woodward.
By Rufus B. Fowler
Attorney

UNITED STATES PATENT OFFICE.

EDWARD M. WOODWARD, OF WORCESTER, MASSACHUSETTS.

DEVICE FOR TRANSMITTING POWER.

1,016,535. Specification of Letters Patent. Patented Feb. 6, 1912.

Application filed October 29, 1908. Serial No. 460,037.

*To all whom it may concern:*

Be it known that I, EDWARD M. WOODWARD, a citizen of the United States, residing at Worcester, in the county of Worcester and Commonwealth of Massachusetts, have invented a new and useful Improvement in Devices for Transmitting Power, of which the following is a specification, accompanied by drawings forming a part of the same, in which—

Figure 1 represents in elevation a power transmitting mechanism embodying my invention, embodying a single driving pulley and multiple driven pulleys. Fig. 2 represents the same but having multiple driving and multiple driven pulleys. Fig. 3 is a plan view on a larger scale of one of the belt shippers. Fig. 4 is a side view shown in section on line 4—4, Fig. 3, and showing the sliding bolt engaging the reciprocating shipper rod 17. Fig. 5 is a side view shown in section on line 4—4, Fig. 3, and showing the locking bolts engaging the fixed shipper rod 16, and Fig. 6 is a view on a larger scale of the driving shaft, with the driving pulleys shown in central sectional view.

Similar reference letters and figures refer to similar parts in the different views.

My present invention relates to an improved device for transmitting power, comprising driving and driven pulleys having belt connections, and it has for its object to provide means in belt driving mechanisms, whereby the power transmitted to the driving shaft through the belt connection may be increased or whereby the speed of the driven shaft may be varied, and these objects are accomplished by the construction and arrangement of parts as hereinafter described and pointed out in the annexed claims.

The power transmitting mechanism forming the subject of my present invention is applicable for a variety of purposes embodying a belt connection between driving and driven pulleys. I deem it especially applicable for the purpose of transmitting power from a countershaft to the main driving shaft of a metal planer, and I have therefore illustrated the construction and character of my present device in its application to a metal planing machine.

In Figs. 1 and 2, 1 represents a portion of the bed of a metal planing machine, and 2 the main shaft of the metal planer to which are attached the tight pulleys 3 and 4. Carried by the shaft 2 are similar loose pulleys 5 and 6, said tight and loose pulleys being of the same size, whereby belts are capable of being shifted from one to the other by means of the belt eyes 7 and 8. The pulleys carried upon the shaft 2 are provided with belt connections 9 and 10, in Fig. 1, with a single driving pulley 11 carried on a countershaft 12. In Fig. 2, the pulley 6 is connected by a belt connection 13 with a pulley 11, and the driven pulley 3 is connected by a belt connection 14 with a smaller driving pulley 15 on the countershaft 12. The belt eyes 7 and 8 are capable of sliding upon a fixed rod 16 parallel with the axis of the driven shaft 2 by means of a longitudinally reciprocating shipper rod 17 actuated by means of a lever handle or other suitable connection in the usual manner by the attendant.

The belt eyes 7 and 8 are duplicates of each other and one is shown upon a larger scale in Figs. 3 and 4. The belt eye is provided with sleeves 18 and 19, capable of sliding freely upon the rods 16 and 17. Between the sleeves 18 and 19 is a sliding bolt 20, having a handle 21, by which the bolt 20 may be rotated or slid in the sleeves. The length of the bolt 20 is substantially equal to the distance between the rods 16 and 17, so that when the bolt is placed in its middle position, it will be supported by the sleeves but will be free from the rods, thereby allowing the belt eye to be moved freely along both of the rods 16 and 17. Each of the rods 16 and 17 is provided with holes 22 and 23 adapted to receive the ends of the sliding bolt 20 as the latter is moved toward the rod 16 or toward the rod 17, thereby locking the belt eye to either one of the two rods 16 and 17 at will. The bolt 20 is held from a sliding movement in one direction or the other as the case may be by bringing the handle 21 upon one side or the other of a fixed stud 24, and in these positions the sliding bolt will be locked securely in engagement with one or the other of the rods 16 or 17.

In Fig. 4 the sliding bolt is shown as locking the belt eye to the reciprocating shipper rod 17 and allowing it to slide freely on the fixed rod 16.

In Fig. 5 the bolt is shown as engaging the fixed rod 16 allowing the reciprocating shipper rod 17 to move freely through the sleeve 19 without actuating the belt eye. By rocking the bolt 20 the handle 21 may be raised so as to clear the fixed stud 24 and allow the bolt to slide into engagement with either of the rods 16 or 17.

Upon the countershaft 12 is mounted a pulley 15 having its face in alinement with the faces of the driven pulleys 3 and 5, and also an adjustable broad faced pulley 11, of larger diameter than the pulley 15, capable of carrying a belt which can be shifted from the pulley 4 to the pulley 6 and vice versa, as shown in Fig. 2. The larger pulley 11 has a face substantially double the width of the smaller pulley 15, which face is supported upon a central web or spokes 25. When the pulley 11 is shifted from the position shown in Fig. 2, to that shown in Fig. 1, one half of the face of the pulley 11 incloses the pulley 15 and is brought into position to receive the belt 9, while the remaining half of the face of the pulley 11 carries the belt 10.

In the position of the pulleys shown in Fig. 1, the shaft 2 will be driven at the same speed by each of the belts 9 and 10, but greater power will be imparted through the two belt connections than if a single belt were used. When the driving pulleys 11 and 15 are adjusted in the position shown in Fig. 2, the shaft 2 will be driven at different speeds through the belt connections 13 and 14.

When the shaft 2 is driven from the pulleys 11 and 15 as shown in Fig. 2, either of the two speeds may be selected as the speed for the shaft 2 by locking one of the belt eyes to the fixed rod 16, in position to hold its belt on the corresponding loose pulley and attaching the other belt eye to the shipper rod 17. One of the belt eyes will thereby become operative through its connection with the shipper rod 17 to ship its belt from the tight to the loose pulley and vice versa, while the other belt eye will be held in an inoperative position through its connection with the fixed rod 16, thereby permanently holding its belt upon the corresponding loose pulley. Either of the belt eyes 7 or 8 may be made the operative belt eye, causing the driven shaft 2 to be rotated by a speed determined by the size of either of the pulleys 11 or 15.

I claim,

1. A power transmitting device, comprising a driving pulley and two pairs of tight and loose driven pulleys, a separate belt connecting said driving pulley with each pair of said tight and loose pulleys, a single shipping means, with a separate connection between each belt and said means, arranged to ship both of said belts simultaneously, or each belt independently without movement of the other belt as desired.

2. A power transmitting device, comprising a driving pulley and two pairs of tight and loose driven pulleys, a separate belt connecting said driving pulley with each pair of said tight and loose pulleys, a single rod for shipping said belts, and separate means for connecting and disconnecting at will each belt with said shipping rod, each of said connecting means arranged to be operated to cause the shipping of said belt without change in the position of the other.

3. A power transmitting device, comprising a driving pulley and two pairs of tight and loose driven pulleys, a separate belt connecting said driving pulley with each pair of said tight and loose pulleys, an independent belt eye for each belt, a supporting rod arranged to support said belt eyes, each independent belt eye arranged to be operatively connected and disconnected at will with said rod, and means for holding the disconnected belt eye from movement.

4. A power transmitting device, comprising a driving pulley and two pairs of tight and loose driven pulleys, a separate belt connecting said driving pulley with each pair of said tight and loose pulleys, a common shipping mechanism for said belts, with a separate connection for each belt, with said mechanism arranged to be operated at will, whereby each belt is transferred from one pulley to the other of a single pair of driven pulleys by said shipping mechanism as desired irrespective of the position of the other belt.

5. The combination with two pairs of tight and loose pulleys having a common axis and having belt connections for each pair, of a fixed rod parallel with the axis of said pulleys, belt eyes for each of said belt connections capable of sliding on said rod, a shipper rod, and means for connecting each of said belt eyes alternately with said fixed rod or said shipper rod at will.

6. In a power transmitting device, the combination of two pairs of tight and loose pulleys and a belt connection for each pair, a belt eye for each belt, a fixed rod or guideway for said belt eyes, a common shipper rod for said belt eyes, and means for connecting each belt eye separately with said fixed rod or with said shipper rod at will, whereby one belt eye may be moved and the other held from movement as desired.

7. In a power transmitting mechanism, the combination with a driving and a driven shaft, of two pairs of tight and loose pulleys on said driven shaft, a pulley on said driving shaft having a belt connection with one pair of said tight and loose pulleys, and a pulley on said driving shaft, capable of inclosing said first driving pulley and provided with a face capable of carrying belt connections for both pairs of said tight and loose pulleys.

8. In a power transmitting mechanism, the combination with two pairs of driven tight and loose pulleys, of a driving pulley having a face capable of carrying a belt connection for one pair of said tight and loose pulleys, and a second larger driving pulley having a face capable of carrying belt connections for both pairs of said tight and loose pulleys, said second driving pulley capable of being placed in telescopic relation with said first driving pulley.

9. In a power transmitting mechanism, comprising a belt connection, the combination of a guide way for a belt eye, a parallel reciprocating shipper rod, connected sleeves slidable on said guide way and said shipper rod, a belt eye carried by said sleeves, a bolt carried by said sleeves and longitudinally slidable to engage either said guide way or said shipper rod, and means for locking said bolt from movement.

10. In a power transmitting mechanism, comprising two belt connections, the combination of a fixed rod forming a guide way for a pair of belt eyes, a parallel reciprocating shipper rod, connected sleeves slidable on said rods, and carrying belt eyes for said belt connections, and a slidable bolt supported by said sleeves and adapted to engage alternately either said fixed rod or said shipper rod.

EDWARD M. WOODWARD.

Witnesses:
 RUFUS B. FOWLER,
 PENELOPE COMBERBACH.

Copies of this patent may be obtained for five cents each, by addressing the "Commissioner of Patents, Washington, D. C."